United States Patent [19]

Schild et al.

[11] Patent Number: 4,872,999

[45] Date of Patent: * Oct. 10, 1989

[54] MIXTURE OF HALIDES SUCH AS NAOCL AND A BROMIDE SALT FOR REMOVAL OF MUSSELS AND BARNACLES FROM SALT OR BRACKISH WATER

[75] Inventors: Ronald H. Schild; Sandra Koeplin-Gall, both of Naperville, Ill.; Gregory C. Broxterman, Midlothian, Va.

[73] Assignee: Nalco Chemical Company, Naperville, Ill.

[*] Notice: The portion of the term of this patent subsequent to Feb. 17, 2004 has been disclaimed.

[21] Appl. No.: 74,966

[22] Filed: Jul. 17, 1987

[51] Int. Cl.$^4$ ............................................... C02F 1/50
[52] U.S. Cl. ..................................... 210/754; 210/764
[58] Field of Search ....................... 210/764, 753–755, 210/765

[56] References Cited

U.S. PATENT DOCUMENTS 4,417,799  10/1983  Ito et al. .......................... 210/764 X
4,579,665   4/1986  Davis et al. ..................... 210/764 X
4,643,835   2/1987  Koeplin-Gall et al. ......... 210/764 X Primary Examiner—Tom Wyse
Attorney, Agent, or Firm—John G. Premo; John S. Roberts, Jr.

[57] ABSTRACT

A method for the control of marine fouling in salt or brackish water by a combination of a chlorine solution and a bromide salt such as an alkali metal bromide and about 1–10% of a biodispersant. In the preferred embodiment, the bromide salt is combined with a chlorine solution in the ratio of about 0.25 to about 1.25 equivalents.

6 Claims, 7 Drawing Sheets

PHASE I RESULTS WITH COMPARISON OF
CONTINUOUS CHLORINATION VERSUS NO TREATMENT

TWB WITH NO TREATMENT

TWB WITH CONTINUOUS CHLORINATION TREATMENT

PHASE I RESULTS WITH COMPARISON OF
CONTINUOUS CHLORINATION VERSUS NO TREATMENT

SETTING PLATES - No treatment (top)
and Continuous Chlorination (bottom)

PHASE II RESULTS WITH COMPARISON OF
CONTINUOUS ACTI-BROM VERSUS NO TREATMENT

TWB WITH NO TREATMENT

TWB WITH CONTINUOUS ACTI-BROM TREATMENT

PHASE II RESULTS WITH COMPARISON OF
CONTINUOUS ACTI-BROM VERSUS NO TREATMENT

SETTING PLATES - No treatment (2 plates on left)
and Continuous Acti-Brom (2 plates on right)

PHASE III RESULTS WITH COMPARISON OF INTERMITTENT
CHLORINATION VERSUS INTERMITTENT ACTI-BROM TREATMENT

TWB - Chlorination (Left)
and Acti-Brom (Right)

SETTING PLATES - Chlorination (Two on left)
and Acti-Brom Treatment (Two on right)

PHASE IV RESULTS WITH
INTERMITTENT ACTI-BROM TREATMENT

SETTING PLATES FROM TWB WITH INTERMITTENT
ACTI-BROM (8 x 15-minutes/day)

MIXTURE OF HALIDES SUCH AS NAOCL AND A BROMIDE SALT FOR REMOVAL OF MUSSELS AND BARNACLES FROM SALT OR BRACKISH WATER

BACKGROUND

Salt, sea water, and brackish water is a favorite habitat for marine organisms. Though small when they enter the port of a cooling tower, these marine organisms remain in the cooling system and grow and become a nuisance or destroy or incapacitate the cooling system structures. The problem at the cooling tower is duplicated in other surroundings. Thus, in places where sea water is used, or in the so-called Tidewater area of Virginia where a brackish water prevails, especially in the York and James Rivers, marine fouling is a major problem.

The exact mechanisms of marine fouling on clean surfaces are not completely understood; however, substrates exposed to saline waters are initially covered by slime-forming microorganisms. The first step is the attachment of capsulated bacteria, diatoms and some protozoa. In velocity areas of cooling systems, the slime layer forms a film for subsequent attachment by higher organisms. Low velocity areas of cooling systems may include trash racks, strainers, screens and other components of intake structures, pump structures, approach conduits and tunnels, blends in piping, manhole access tunnels, condenser water boxes and tube sheets. Usually, the water velocity where macrofouling attachment occurs is less than 4 feet/second. Primary marine fouling organisms (such as barnacles, bryozoans and hydroids) follow almost immediately after the development of the slime film when their larvel forms are present in the ecosystem. These are later joined by secondary fouling organisms, such as anenomes and mussels. The primary foulers appear to alter the conditions of the surface, so that it is more suitable for settlement of the secondary foulers. This rapid succession of foulers ultimately leads to an equilibrium or climax condition characteristic of the locality and substrate.

Barnacles have a worldwide distribution and are one of the most common fouling organisms, with numerous species occurring along the coastline of the United States. Of the many organisms which have been found in sea water culverts, the barnacle has proven to be the most troublesome. Barnacle larvae can attach themselves to a solid surface under higher rates of fluid shear than any other animal (8.9 feet/second); their presence then forms a roughness which reduces local shear to values at which settlement of other species can recur.

Most barnacles are hermaphroditic (containing both male and female sexual organs in the same individual). Egg fertilization occurs internally and development proceeds within the adult until the larvae are released as free-swimming nauplii. During a period of active swimming and growth, the barnacle nauplius moults several times into slightly different forms until transformation into a cyprid larvae. The cyprid invades cooling water systems and settles on a suitable substrate. Once settled, the cyprid secretes a cement and begins to build its shell. During the initial stage of shell formation, the barnacle may detach if conditions are unfavorable. However, once an easily recognized shell is formed, the barnacle is incapable of locomotion.

It has been shown that cyprid larvae that have settled on a substrate can cement themselves permanently within 18 minutes and that metamorphosis to the juvenile stage occurs within 20 hours.

The most common fouling barnacles belong to the genus Balanus, with several species occurring on each coast of the United States. Balanus belongs to the general group of barnacles referred to as acorn barnacles, which include all those whose shells are attached directly to the substrate. Unlike the goose barnacles, whose attachment to a substrate is a muscular stalk which disintegrates after death, acorn barnacle shells remain firmly attached even after death. This permanent attachment makes the acorn barnacle more of a problem to control.

As used herein, the term macrofoulant defines primary and secondary marine fouling organisms including but not limited to barnacles, bryozoans, hydroids, anenomes, mussels, cyprids, mollusks, and the like.

The present invention uses for certain marine organisms that which has previously been patented for fresh water and for controlling asiatic clams, U.S. Pat. No.4,643,835 Koeplin-Gall, et al (Nalco). The dosage is the same where the proportion of bromide salts to chlorine as hypochlorous acid is from about 0.25 to about 1.5 equivalents. The chlorine can be in the form of a liquid chlorine. Such chlorine solutions can be prepared by the dissolution of gaseous chlorine in water, forming through hydrolysis hypochlorous acid and hydrochloric acid. Chlorine solutions of sodium hypochlorite will also work. By the term "aqueous chlorine solution" as used herein is meant solutions equivalent to that derived from dissolution of chlorine in water or acidic solutions containing chlorine as the hypochlorous acid or solutions of sodium or calcium hypochlorite.

Bromide may be substituted for potassium bromide in the composition, such as by using sodium bromide. One feature of the combination forming the composition of the present invention is the formation of hypobromous acid by the displacement of at least some chlorine of the hypochlorous acid with bromine derived from the bromide salt, forming a generally innoxious chloride salt by-product. Thus, the composition is a combination which includes at least some hypobromous acid and is thus more effective in typical water systems at least due to the greater activity of bromamines over chloramines that are formed when ammonia is present in the system. The composition of the present invention results in effluent discharges of lower toxicity due at least to the greater instability of bromine residuals.

The degree of conversion is hypochlorous acid to hypobromous acid depends of course to an extent on the relative proportion of bromide salt to hypochlorous acid which are combined to form the composition and other factors affecting the displacement of chlorine with bromine. The present invention encompasses not only a complete or near complete displacement of bromine for the chlorine in the hypochlorous acid, providing essentially a bromination system, but displacement far short of this.

Also, it is necessary to have a biodispersant which may be about 10% of the total composition. The biodispersant may be ethylene oxide condensates with propylene oxide adducts or propylene glycol having an HLB between 4–10 and a molecular weight between 1,000–5,000, nonionic polyethoxylated straight chain alcohols, tris cyanoethylated cocodiamines, polyoxyethylene sorbitan ester/acids, nonionic N,N, dimethyl stearamides, nonionic amine polyglycol condensates, and nonionic ethoxylated alcohols, and mixtures thereof.

The problems in fresh water with asiatic clams are not duplicated by the problems here in salt water as in removing barnacles and mussels.

With relation to the combination biocide, the solution contains a bromide salt and a biodispersant designed to improve chlorine activity. Such a combination combining sodium hypochlorite and the present invention meets all the criteria for a preferred biocide; it is environmentally accepted, safe to handle, and easy to feed.

EVALUATION OF BIOCIDE FOR CONTROL OF MACROFOULING

To evaluate control of microfouling, test water boxes (TWB) were installed on a sidestream of water obtained from the intake canal. The TWB is designed to simulate conditions in low flow, non-heat transfer areas of cooling systems. This includes transfer piping, inlet and outlet wateer boxes, and tube side and shell side heat exchangers. A TWB is shown in the figures.

Figure 1:
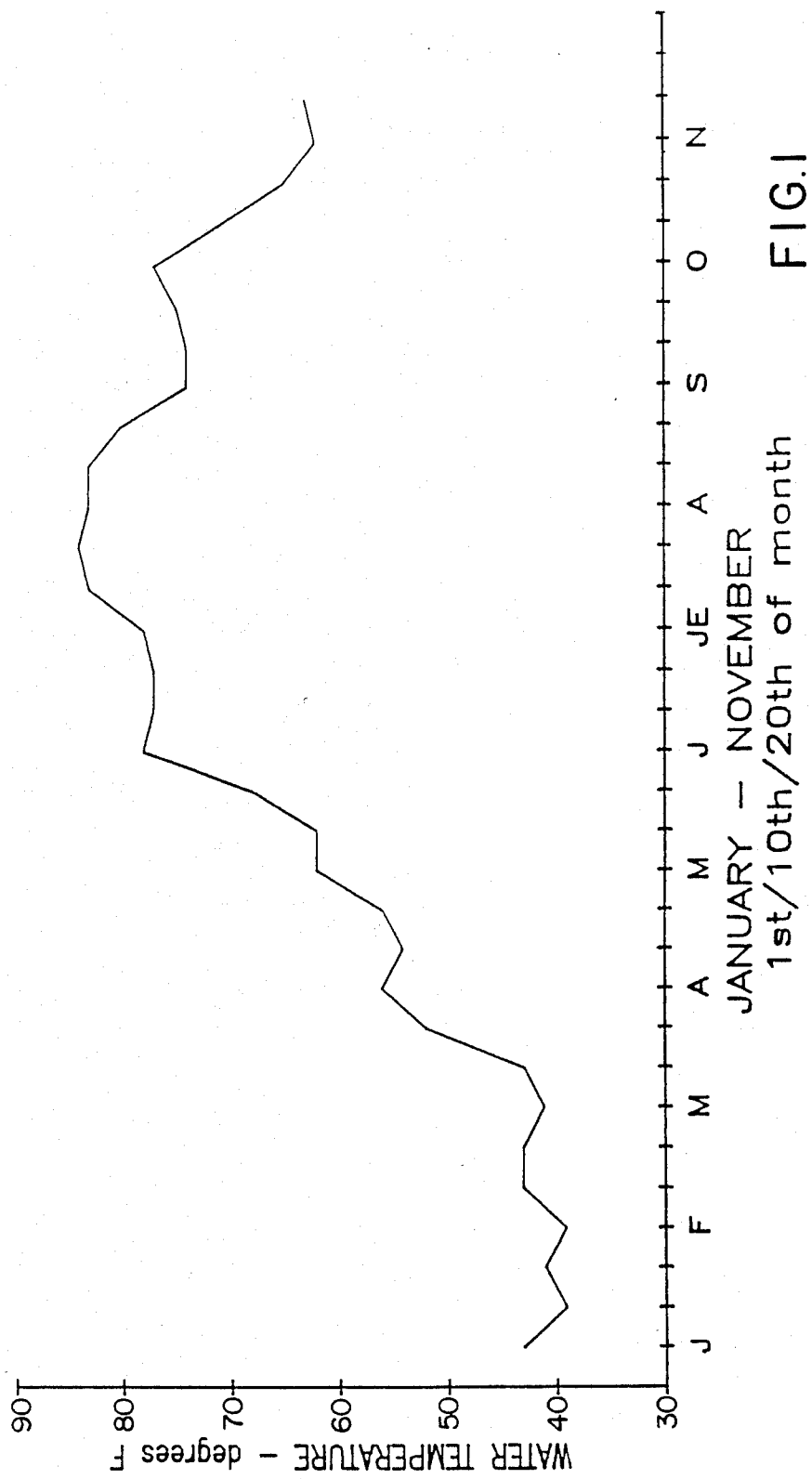
FIG. 1 shows water temperatures for the intake canal recorded during a test period where setting plates were placed in the test water boxes (TWB) to encourage the recruitment of the macrofouling community. The setting plates were made of a compressed asbestos cement board to evaluate control of barnacles and other macroorganisms. The material is non-toxic with an appropriate roughness to allow setting. Cooling water flow through the TWB was established at 3 GPM, approximately 0.5 feet/second.

Setting plates were placed in the TWB to encourage the recruitment of the macrofouling community. The setting plates were made of a compressed asbestos cement board. This material has been used previously by others for evaluating control of barnacles and other macroorganisms. The material is non-toxic with an appropriate roughness to allow setting. Cooling water flow throught he TWB was established at 3 GPM, approximately 0.5 feet/second. Water temperatures for the intake canal recorded during the test period are presented in FIG. 1.

The pilot study consisted of a series of test phases comparing Acti-Brom and chlorine to chlorine alone. The test phases and the results are shown below.

EXAMPLE 1

Phase I. Phase I consisted of a comparison of continuous chlorination versus no treatment. A sodium hypochlorite solution was used as the chlorine source and was pumped continuously with a liquid metering pump. The pump rate was established to provide an 0.2 ppm TRC (total residual chlorine) at the TWB outlet.

Figure 2:
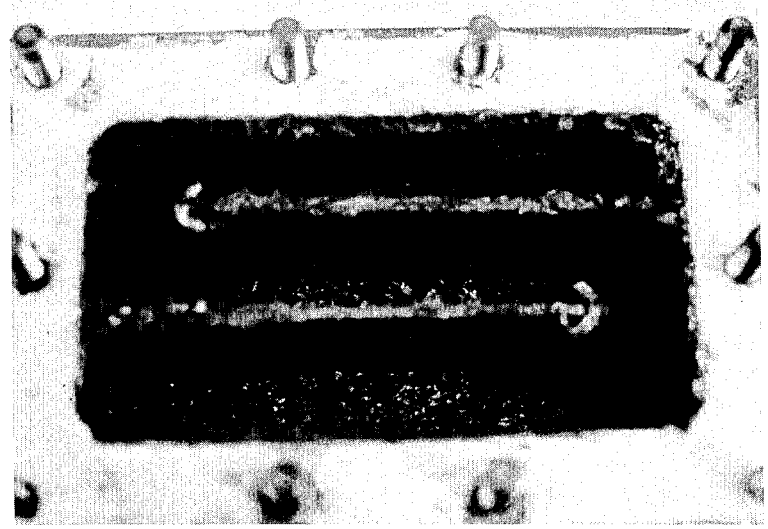
FIG. 2 shows a comparison of TWB with continuous chlorination verus no treatment. Confer Example 1.
Figure 2A:
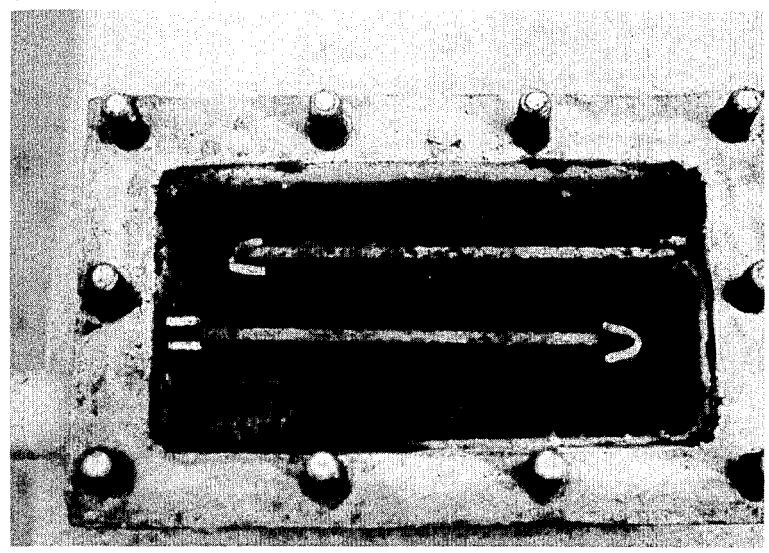
Figure 3:
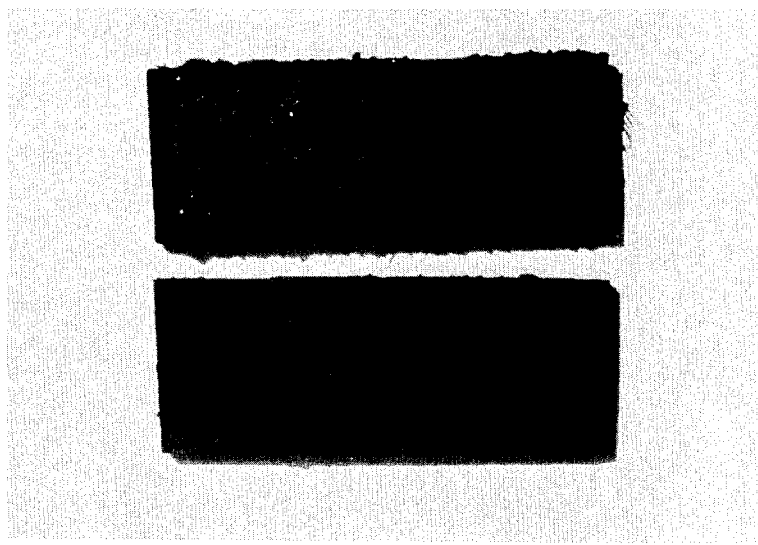
FIG. 3 shows a comparison of setting plates with continuous chlorination versus no treatment.

The setting plates were exposed for a 22-day test period between June 4 and June 26, 1986. FIGS. 2 and 3 illustrate the results obtained in the two test water boxes.

The control water box (no treatment) was heavily fouled with slime, bryozoa, cyprids, Polydora, and some barnacles. The TWB treated with continuous chlorination appeared free of all organisms with the exception of barnacles. Barnacle recruitment was much greater on the continuously chlorinated TWB than on the control TWB. Continuous chlorination actually provided a more favorable environment for barnacle recruitment.

The shells of the acorn barnacles were firmly attached. Even after drying the setting plates in a drying oven, the barnacle shells could only be removed by mechanical scraping.

EXAMPLE 2

Phase II. Phase II consisted of a comparison of continuous Acti-Brom® (Nalco Chemical Company, Naperville, IL) and chlorine versus no treatment. The bromide-chlorine-biodispersant treating agent falls within the percentile in the abstract of about 0.25 to about 1.25 equivalents. Two chemical metering pumps were utilized to inject a sodium hypochlorite solution and Acti-Brom® solution into the line leading to the treated TWB. An 0.2 ppm TRC was established and maintained at the TWB outlet.

Figure 4:
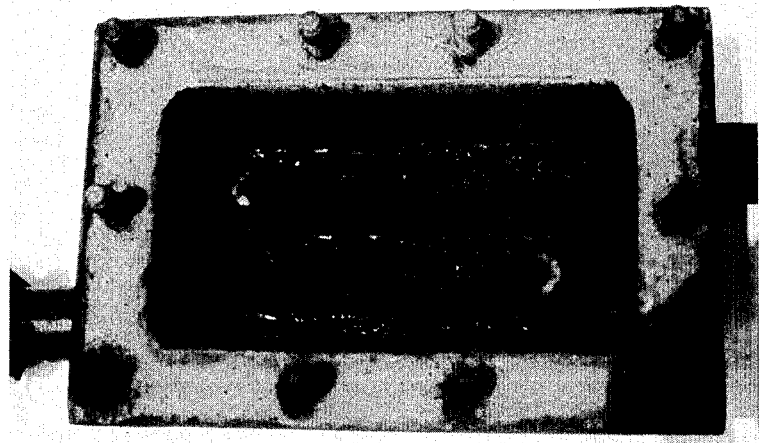
FIG. 4 shows a comparison of TWB with continuous treatment with the composition of the present invention versus no treatment.
Figure 4A:
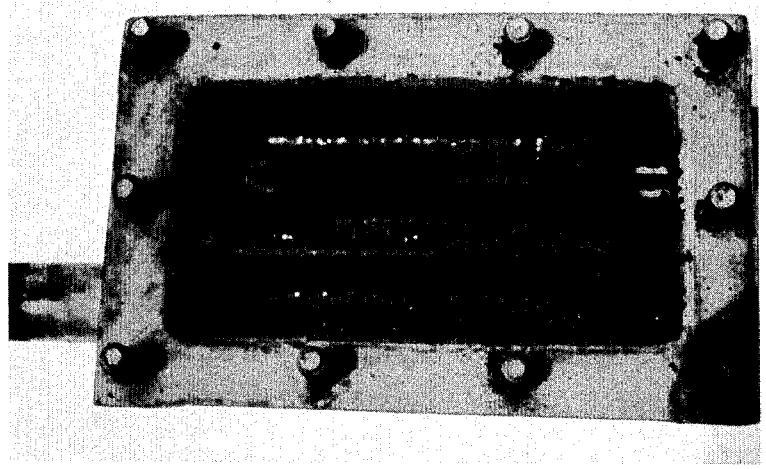
Figure 5:
FIG. 5 shows a comparison of setting plates with continuous treatment with the composition of the present invention versus no treatment.

The setting plates were exposed for a 19-day period from June 26 through July 15, 1986. FIGS. 4 and 5 illustrate the results obtained in the two test water boxes utilized in this phase.

The results indicated excellent control could be achieved with continuous Acti-Brom®. Virtually all fouling was eliminated in the TWB and setting plates. The control water box (no treatment) again was heavily fouled and appeared similar to the control TWB observed in Phase I.

EXAMPLE 3

Phase III. Phase III consisted of intermittent treatment with Acti-Brom® and chlorine compared to intermittent treatment with chlorine alone. Both treatments consisted of four 30-minute application periods per day at a dosage required to obtain an 0.2 ppm TRC at the TWB outlet. The total chlorine feed duration of 120 minutes/day represents the maximum allowed by Yorktown Station's NPDES permit. Three chemical metering pumps were used to apply the prescribed treatment to the two test water boxes. Automatic cycle timers were installed to provide four 30-minute treatment periods per day at six-hour intervals.

Figure 6:
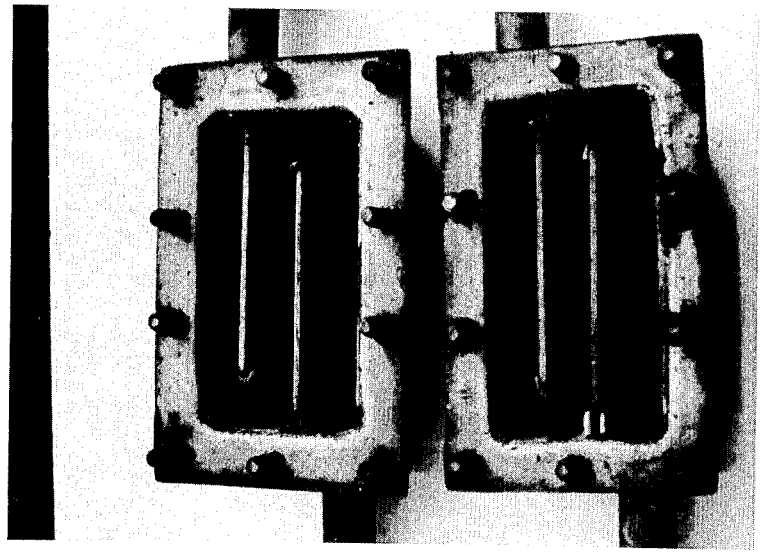
FIG. 6 shows (A) comparison of TWB with intermittent chlorination versus intermittent treatment with the composition of the present invention, and (B) comparison of setting plates with intermittent chlorination versus intermittent treatment with the composition of the present invention.
Figure 6A:
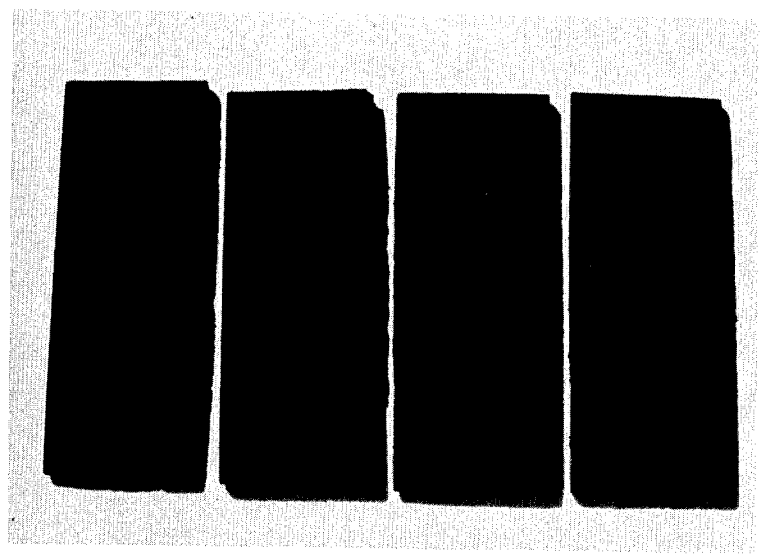

The setting plates were exposed for a 12-day period from September 11 through Sept. 23, 1986. FIG. 6 illustrates the results obtained in the two TWBs during this test phase.

The chlorinated water box and setting plates exhibited noticeable fouling. Bryozoa and numerous barnacles were recruited on the monitoring equipment. Slime appeared to be effectively controlled.

The Acti-Brom® treated water box was relatively clean and exhibited very little fouling. Only a few barnacles were attached to the setting plates. No other fouling was observed.

A side-by-side comparison of the setting plates shows a distinct difference in the effectiveness of the two treatment programs. In fact, Acti-Brom® and chlorine applied for 2 hours per day exhibited much better control than continuous chlorination.

EXAMPLE 4

Phase IV. Phase IV evaluated the effectiveness of Acti-Brom® and chlorine applied at eight 15-minute periods per day. This test was an extension of Phase III where Acti-Brom® was applied for four 30-minute periods.

Figure 7:
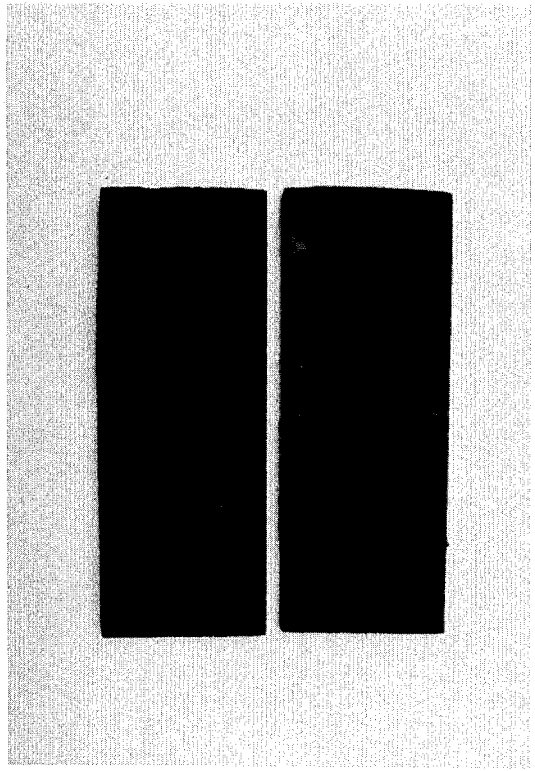
FIG. 7 shows the setting plates from TWB with intermittent treatment (8×15-minutes/day) with the composition of the present invention.

The setting plates were exposed for a 12-day period from October 1 through Oct. 13, 1986. FIG. 7 illustrates the results obtained during this test phase.

The results indicated similar performance for Acti-Brom® applied at eight 15-minute periods versus four 30-minute periods.

OVERALL RESULTS

The results of the above examples indicate that Acti-Brom® can effectively control macrofouling and microfouling in cooling water systems.

Chlorination has not shown to be effective in controlling barnacles. The barnacle has been particularly troublesome, since it forms a shell which remains even after death. The scientific literature indicates that barnacle larvae can attach themselves permanently within 18 minutes and that metamorphosis to the juvenile stage occurs within 20 hours. The use of Acti-Brom® prevented permanent attachment when applied at four 30-minute periods and at eight 15-minute period per day.

Acti-Brom® can be used in conjunction with either gaseous chlorine or liquid sodium hypochlorite solution for effective biocontrol. The objective of the application is to minimize macrofouling in a once-through cooling water system.

We claim:

1. A method for controlling barnacles and a slime layer of a slime-forming organism selected from the group consisting of capsulated bacteria, diatoms and protozoa in salt water and brackish water, and bryozoans from sea water fouling, and selected from one member of the group consisting of barnacles, mussels, cyprpides, Polydora, Hydroides, Molgula, and Taxa in tidal brackish water which comprises treating said water with a composition comprising the combination of chlorine solution and a bromide salt capable of releasing bromide ions to the chlorine solution, and from about 1 up to about 10 percent by weight of a water-soluble biodispersant chosen from the group consisting of ethylene oxide condensates with propylene oxide adducts or propylene glycol having an HLB between 4–10 and a molecular weight between 1,000–5,000, nonionic polyethoxylated straight chain alcohols, tris cyanoethylated cocodiamines, polyoxethylene sorbitan ester/acids, nonionic N,N, dimethyl stearamides, nonionic amine polyglycol condensates, and nonionic ethyoxylated alcohols, and mixtures thereof.

2. The method of claim 1 wherein the proportion of bromide salt to chlorine, as hypochlorous acid, is from about 0.25 to about 1.5 equivalents.

3. A method for controlling macrofoulants in salt water in cooling water systems comprising combining a chlorine solution, at least one bromide salt to produce a water treating agent;

adding an effective amount of said water treating agent to the water of a cooling water system, and adding from about 1 up to about 10 percent by weight of a water-soluble biodispersant chosen from the group consisting of ethylene oxide condensates with propylene oxide adducts or propylene glycol having an HLB between 4–10 and a molecular weight between 1,000–5,000, nonionic polyethoxylated straight chain alcohols, tris cyanoethylated cocodiamines, polyoxyethylene sorbitan ester/acids, nonionic N,N dimethyl stearamides, nonionic amine polyglycol condensates, and nonionic ethoxylated alcohols, and mixtures thereof.

4. The method of claim 3 wherein said water treating agent is added in an amount providing 0.2 ppm total residual chlorine.

5. The method of claim 3 wherein said bromine salt is selected from the group consisting of sodium bromide, alkali earth metal bromides; alkaline earth metal bromides, potassium BR, ammonium BR, and their respective salts.

6. The method of claim 3 wherein said bromide salt is combined with said biodispersant and the resulting solution is added to chlorinated cooling system water.

* * * * *